US006967039B2

(12) United States Patent
O'Hara et al.

(10) Patent No.: US 6,967,039 B2
(45) Date of Patent: Nov. 22, 2005

(54) UNTREATED DIFFUSION MEDIA WITH MESOPOROUS LAYER AND DEVICES INCORPORATING THE SAME

(75) Inventors: Jeanette E. O'Hara, Rochester, NY (US); Joerg Roth, Trubur (DE); Han Liu, Waltham, MA (US)

(73) Assignee: General Motors Corporation, Detroit, MI (US)

( * ) Notice: Subject to any disclaimer, the term of this patent is extended or adjusted under 35 U.S.C. 154(b) by 192 days.

(21) Appl. No.: 10/628,856

(22) Filed: Jul. 28, 2003

(65) Prior Publication Data

US 2005/0026523 A1 Feb. 3, 2005

(51) Int. Cl.$^7$ ................................................. B05D 5/12
(52) U.S. Cl. ...................................... 427/245; 427/373
(58) Field of Search ................................ 427/226, 244, 427/245, 180, 373, 385.5, 389.9, 394

(56) References Cited

U.S. PATENT DOCUMENTS

| | | | |
|---|---|---|---|
| 3,238,068 A | 3/1966 | Hipp | |
| 4,175,055 A | 11/1979 | Goller et al. | |
| 4,405,544 A | 9/1983 | Solomon | |
| 4,468,362 A | 8/1984 | Solomon | |
| 4,536,272 A * | 8/1985 | Blanchart et al. | 204/294 |
| 4,659,528 A | 4/1987 | Plowman et al. | |
| 5,350,643 A | 9/1994 | Imahashi et al. | |
| 5,626,905 A * | 5/1997 | Bachot et al. | 427/122 |
| 5,840,438 A | 11/1998 | Johnson et al. | |
| 5,935,643 A | 8/1999 | Song et al. | |
| 5,952,119 A | 9/1999 | Wilson | |
| 5,998,058 A | 12/1999 | Fredley | |
| 6,127,059 A | 10/2000 | Kato | |
| 6,194,094 B1 | 2/2001 | Sugawara et al. | |
| 6,280,870 B1 | 8/2001 | Eisman et al. | |
| 6,280,872 B1 | 8/2001 | Ozaki et al. | |
| 6,303,245 B1 | 10/2001 | Nelson | |
| 6,350,539 B1 | 2/2002 | Wood, III et al. | |
| 6,365,293 B1 | 4/2002 | Isono et al. | |
| 6,368,476 B1 | 4/2002 | DeMarinis et al. | |
| 6,413,664 B1 | 7/2002 | Wilkinson et al. | |

(Continued)

FOREIGN PATENT DOCUMENTS

EP          0 126 511 A        11/1984

(Continued)

OTHER PUBLICATIONS

Regan, Christopher; Mesoporous Structures; Apr. 8, 2002 http://www.rpi.edu/locker/25/001225 public_html/nano_02/cregan/regan/mesoporous.html.

(Continued)

Primary Examiner—Erma Cameron
(74) Attorney, Agent, or Firm—Dinsmore & Shohl LLP

(57) ABSTRACT

A diffusion media and a process for its fabrication are provided for addressing issues related to water management in electrochemical cells and other devices employing the diffusion media. In accordance with one embodiment of the present invention, a process for fabricating a diffusion media is provided. A diffusion media substrate is provided comprising a porous fibrous matrix defining first and second major faces. The substrate comprises an amount of carbonaceous material sufficient to render the substrate electrically conductive. A mesoporous layer is applied along at least a portion of one of the first and second major faces of the substrate. The mesoporous layer is applied to the substrate by providing a coating comprising a hydrophobic component, a hydrophilic component, and a pore forming agent. The substrate is free of fluorinated polymers outside of regions of the substrate carrying the mesoporous layer. The pore forming agent is decomposed such that the mesoporous layer is more porous than the diffusion media substrate.

33 Claims, 2 Drawing Sheets

U.S. PATENT DOCUMENTS

| | | |
|---|---|---|
| 6,444,347 B1 | 9/2002 | Ouvry et al. |
| 2002/0142205 A1 | 10/2002 | Kim et al. |
| 2005/0084742 A1 * | 4/2005 | Angelopoulos et al. ....... 429/44 |

FOREIGN PATENT DOCUMENTS

| | | | |
|---|---|---|---|
| EP | 0292 431 A | | 11/1988 |
| EP | 0 846 347 B1 | | 6/2000 |
| EP | 1 239 528 A | | 9/2002 |
| FR | 2 413 796 A | | 7/1979 |
| GB | 2012100 | * | 7/1979 |
| JP | 62-226583 | * | 10/1987 |

OTHER PUBLICATIONS

Han et al; Simple Silica-Particle Template Synthesis of Mesoporous Carbons; Chem. Commun., 1999, p. 1955.

* cited by examiner

UNTREATED DIFFUSION MEDIA WITH MESOPOROUS LAYER AND DEVICES INCORPORATING THE SAME

CROSS-REFERENCE TO RELATED APPLICATIONS

This application is related to commonly assigned U.S. patent application Ser. Nos. 10/628,318, filed Jul. 28, 2003 and Ser. No. 10/628,316 filed Jul. 28, 2003, the disclosures of which are incorporated herein by reference. The present application is also related to commonly assigned U.S. patent application Ser. No. 10/685,346, filed Oct. 14, 2003.

BACKGROUND OF THE INVENTION

The present invention relates to the design and manufacture of diffusion media and, more particularly, to diffusion media for use in electrochemical cells where water management is a significant design issue.

BRIEF SUMMARY OF THE INVENTION

According to the present invention, a diffusion media and a process for its fabrication are provided for addressing issues related to water management in electrochemical cells and other devices employing the diffusion media. In accordance with one embodiment of the present invention, a process for fabricating a diffusion media is provided. A diffusion media substrate is provided comprising a porous fibrous matrix defining first and second major faces. The substrate comprises an amount of carbonaceous material sufficient to render the substrate electrically conductive. A mesoporous layer is applied along at least a portion of one of the first and second major faces of the substrate. The mesoporous layer is applied to the substrate by providing a coating comprising a hydrophobic component, a hydrophilic component, and a pore forming agent. The substrate is free of fluorinated polymers outside of regions of the substrate carrying the mesoporous layer. The pore forming agent is decomposed such that the mesoporous layer is more porous than the diffusion media substrate.

In accordance with another embodiment of the present invention, a process for fabricating a diffusion media is provided. According to the process, the mesoporous layer is applied to the substrate by providing a coating comprising a hydrophobic component, a hydrophilic component, a pore forming agent, and a solvent. The hydrophobic component comprises a fluorinated polymer. The hydrophilic component comprises a carbonaceous substance selected from carbon fibers, carbon particles, and combinations thereof. The carbonaceous substance is characterized by a surface area of about 60 $cm^2/g$. The pore forming agent comprises ammonium carbonate. The substrate is free of fluorinated polymers outside of regions of the substrate carrying the mesoporous layer. A sufficient amount of the mesoporous layer is applied to the substrate to substantially increase a porosity of the diffusion media relative to the diffusion media absent the mesoporous layer. The substantial increase in the porosity of the diffusion media is between about 5% and about 15%. The solvent is selected from $H_2O$, isopropanol, and combinations thereof. The coating is provided such that it at least partially infiltrates the diffusion media substrate. The pore forming agent is decomposed in a heat-treating process such that the mesoporous layer is more porous than the diffusion media substrate.

In accordance with yet another embodiment of the present invention, a device comprising a diffusion media is provided wherein the diffusion media comprises a diffusion media substrate and a mesoporous layer. The diffusion media substrate comprises a porous fibrous matrix defining first and second major faces and an amount of carbonaceous material sufficient to render the substrate electrically conductive. The diffusion media substrate carries the mesoporous layer along at least a portion of one of the first and second major faces of the substrate. The mesoporous layer comprises hydrophobic and hydrophilic components defining hydrophobic and hydrophilic regions within the mesoporous layer. The mesoporous layer comprises an amount of carbonaceous material sufficient to render the mesoporous layer electrically conductive. The mesoporous layer is characterized by a porosity greater than a porosity of the diffusion media substrate. The diffusion media substrate is free of fluorinated polymers outside of regions of the substrate carrying the mesoporous layer.

Accordingly, it is an object of the present invention to provide a means for addressing water management issues in diffusion media and devices employing such diffusion media. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
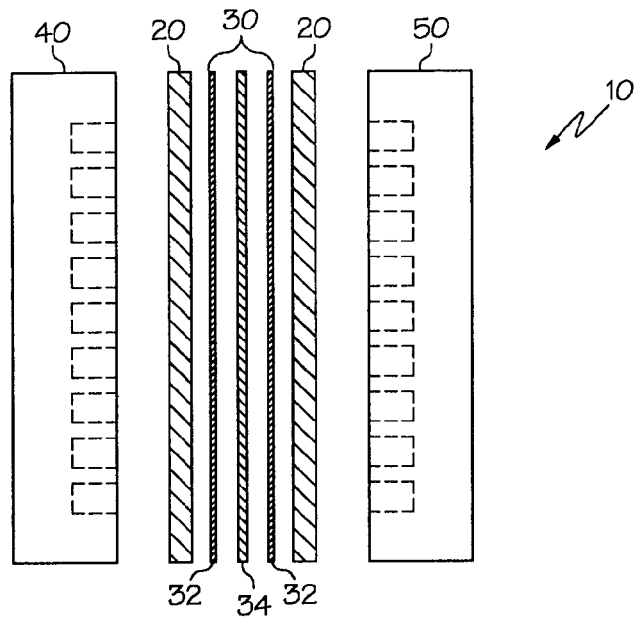
FIG. 1 is a schematic illustration of a fuel cell incorporating a porous diffusion media according to the present invention.

Referring initially to FIG. 1 a fuel cell 10 incorporating a porous diffusion media 200 according to the present invention is illustrated. Specifically, the fuel cell 10 comprises a membrane electrode assembly 30 interposed between an anode flow field 40 and a cathode flow field 50 of the fuel cell 10. It is contemplated that the flow fields 40, 50 and the membrane electrode assembly 30 may take a variety of conventional or yet to be developed forms without departing from the scope of the present invention. Although the particular form of the membrane electrode assembly 30 is beyond the scope of the present invention, in the illustrated embodiment, the membrane electrode assembly 30 includes respective catalytic electrode layers 32 and an ion exchange membrane 34.

Figure 2:
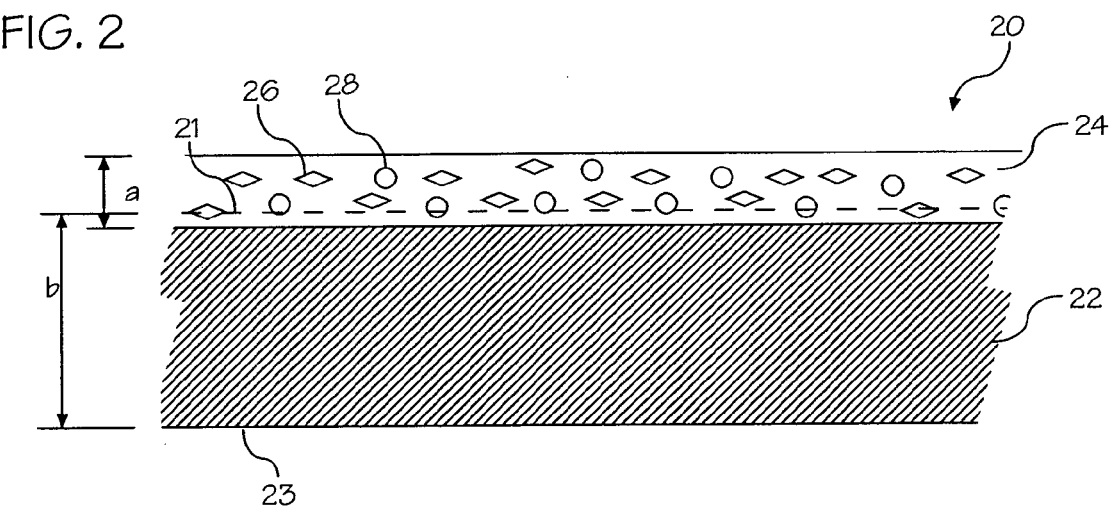
FIG. 2 is a schematic illustration of a porous diffusion media according to one embodiment of the present invention.

Referring now to FIG. 2, a diffusion media 20 according to one embodiment of the present invention is illustrated schematically. The diffusion media 20 comprises a diffusion media substrate 22 and a mesoporous layer 24. The diffusion media substrate 22 comprises a porous fibrous matrix defining first and second major faces 21, 23 and an amount of carbonaceous material sufficient to render the substrate 22 electrically conductive. In the illustrated embodiment, the diffusion media substrate 22 carries the mesoporous layer 24 along the first major face 21 of the substrate 22.

In many embodiments of the present invention the mesoporous layer 24 is more effective in addressing water management issues if it is positioned against the membrane electrode assembly 30 of the fuel cell 10, as opposed to being positioned to face the flow field of the cell. Nevertheless, it is contemplated that the diffusion media substrate 22 may carry the mesoporous layer 24 along either major face 21, 23 of the substrate 22 regardless of which face is positioned against the membrane electrode assembly 30. Further, the mesoporous layer 24 may cover all or a portion of the face along which it is carried.

The mesoporous layer 24 is typically more porous than the diffusion media substrate 22. For the purposes of defining and describing the present invention, it is noted that mesoporous structures are characterized by pore sizes that can range from a few nanometers to hundreds of nanometers. The mesoporous layer 24 comprises a hydrophobic component 26 and a hydrophilic component 28 defining hydrophobic and hydrophilic regions in the layer 24. The hydrophobic component 26 may comprise a fluorinated polymer, e.g., polytetrafluoroethylene (PTFE), polyvinylidene fluoride (PVDF), polyvinyl fluoride (PVF), a combination of fluorinated polymers, or any other suitable hydrophobic material or combination of materials. The hydrophilic component 28 may be presented as a carbonaceous substance like carbon fibers, carbon particles, and combinations thereof, but may alternatively be presented by any other suitable hydrophilic material. By way of illustration and not limitation, it is noted that carbonaceous substances like acetylene black, characterized by surface areas of about 60 cm2/g are suitable hydrophilic materials for the mesoporous layer 24. The mesoporous layer 24 also comprises an amount of carbonaceous material sufficient to render it electrically conductive. Although the hydrophilic or hydrophobic components 28 already present in the layer 24 may be selected to fill this role, it is contemplated that additional components may be incorporated into the layer to render it electrically conductive.

As is illustrated in FIG. 2, the mesoporous layer 24 at least partially infiltrates the diffusion media substrate 22. The extent of infiltration, illustrated schematically by showing the first surface 21 in phantom in FIG. 2, will vary widely depending upon the properties of the mesoporous layer 24 and the diffusion media substrate 22.

The diffusion media substrate 22 is untreated in the sense that it is free of fluorinated polymers. Of course, in embodiments where the mesoporous layer 24 includes fluorinated polymers, it is noted that the diffusion media substrate 22 would be free of fluorinated polymers outside of any regions of the substrate 22 carrying the mesoporous layer 24.

Figure 3:
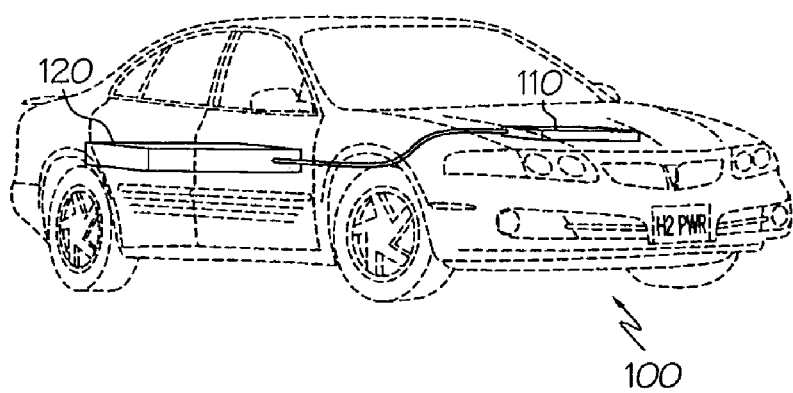
FIG. 3 is a schematic illustration of a vehicle incorporating a fuel cell according to the present invention.

Referring now to FIG. 3, a fuel cell system incorporating diffusion media according to the present invention may be configured to operate as a source of power for a vehicle 100. Specifically, fuel from a fuel storage unit 120 may be directed to the fuel cell assembly 110 configured to convert fuel, e.g., H2, into electricity. The electricity generated is subsequently used as a motive power supply for the vehicle 100 where the electricity is converted to torque and vehicular translational motion.

Referring now to the process by which diffusion media of the present invention may be fabricated, the mesoporous layer is applied to the substrate by providing a coating comprising the hydrophobic component, the hydrophilic component, a pore forming agent, and suitable solvents. The pore forming agent is subsequently decomposed such that the mesoporous layer is more porous than the diffusion media substrate. The solvent may be any suitable solvent including, but not limited to de-ionized $H_2O$, isopropanol, and combinations thereof.

Generally, the coating is provided as a mixture comprising between about 15 wt % and about 40 wt % of the hydrophobic component, between about 85 wt % and about 60 wt % of the hydrophilic component, and between about 0 wt % and about 15 wt % of the pore forming agent. More specifically, the coating is provided as a mixture comprising slightly less than about 20 wt % of the hydrophobic component, slightly less than about 80 wt % of the hydrophilic component, and about 5 wt % of the pore forming agent.

Where the hydrophilic component comprises a carbonaceous substance, the substance may be selected from a variety of materials including, but not limited to, carbon fibers, carbon particles, and combinations thereof. The carbonaceous substance may be characterized by a surface area of between about 50 $cm^2/g$ and about 250 $cm^2/g$. More specifically, and by way of illustration and not limitation, suitable hydrophilic components, like acetylene black, are characterized by surface areas of about 60 $cm^2/g$.

Regarding the pore forming agent, it should comprise a material that tends to substantially increase the pore size of the mesoporous layer as it is applied to the substrate and allowed to cure, dry, harden, or otherwise stabilize. For example and by way of illustration and not limitation, the pore forming agent may comprise ammonium carbonate or any other material selected to decompose in a mixture with the hydrophobic and hydrophilic components upon heating. The decomposition may be particulate free and may comprise gaseous and liquid components. More specifically, the pore forming agent may comprise a material selected such that the mesoporous layer will be substantially free of the components of the pore forming agent upon decomposition of the pore forming agent. Pore forming agents that decompose into gaseous products and water are suitable for many applications of the present invention. For example, products of the thermal decomposition of ammonium carbonate include ammonia, carbon dioxide, nitrogen, and water vapor.

The decomposition of the pore forming agent may be facilitated by heating the coated substrate. Suitable heat treatment temperatures will vary depending upon the composition of the mesoporous layer. For example, where ammonium carbonate is utilized as the pore forming agent, the coated media should be heated to at least about 100° C. to encourage vaporization of water upon decomposition of the ammonium carbonate. Generally, the heat treating process is characterized by temperatures between about 75° C. and about 100° C. or at least above about 65° C.

Regarding the increase in porosity of the diffusion media with the mesoporous layer relative to the diffusion media absent the mesoporous layer, although a wide range in increases are contemplated, increases in the porosity of the diffusion media of between about 5% and about 15% or, more specifically, of about 7.5% are typical for many embodiments of the present invention. By way of illustration and not limitation, according to one embodiment of the present invention the porosity of a diffusion media including a 250 $\mu$m thick carbon fiber paper substrate and a 10 $\mu$m thick mesoporous layer of acetylene black and PTFE is increased from about 78% (absent the mesoporous layer) to about 84% (including the mesoporous layer).

Regarding the respective thicknesses a, b of the diffusion media substrate 22 and the mesoporous layer 24 illustrated in FIG. 2, it is noted that suitable values will vary depending upon the particular application in which the diffusion media is employed. For example, it is contemplated that carbon fiber paper products having thicknesses b of between about 100 µm and about 300 µm will be suitable for use in the present invention with mesoporous layer thicknesses a of between about 10 µm and about 25 µm.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise a diffusion media, a fuel cell incorporating a diffusion media according to the present invention, a vehicle incorporating a fuel cell according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A process for fabricating diffusion media, said process comprising:
providing a diffusion media substrate comprising a porous fibrous matrix defining first and second major faces, wherein said substrate is free of fluorinated polymers and comprises an amount of carbonaceous material sufficient to render said substrate electrically conductive;
applying a mesoporous layer along at least a portion of one of said first and second major faces of said substrate to define a region carrying said mesoporous layer and regions outside of said mesoporous layer, wherein said mesoporous layer is applied to said fluorinated polymer free substrate by providing a coating comprising a hydrophobic component, a hydrophilic component, and a pore forming agent, and said regions outside of said mesoporous layer are free of fluorinated polymers; and
decomposing said pore forming agent such that said mesoporous layer is characterized by a porosity greater than a porosity of said diffusion media substrate.

2. A process as claimed in claim 1 wherein said hydrophobic component comprises a fluorinated polymer.

3. A process as claimed in claim 2 wherein said hydrophobic component comprises PTFE.

4. A process as claimed in claim 1 wherein said coating is provided as a mixture comprising between about 15 wt % and about 40 wt % a of said hydrophobic component.

5. A process as claimed in claim 1 wherein said coating is provided as a mixture comprising about 20 wt % of said hydrophobic component.

6. A process as claimed in claim 1 wherein said hydrophilic component comprises a carbonaceous substance.

7. A process as claimed in claim 6 wherein said carbonaceous substance comprises carbon fibers, carbon particles, or combinations thereof.

8. A process as claimed in claim 6 wherein said carbonaceous substance is characterized by a surface area of between about 50 $cm^2/g$ and about 250 $cm^2/g$.

9. A process as claimed in claim 6 wherein said carbonaceous substance is characterized by a surface area of about 60 $cm^2/g$.

10. A process as claimed in claim 6 wherein said carbonaceous substance comprises acetylene black.

11. A process as claimed in claim 1 wherein said coating is provided as a mixture comprising between about 60 wt % and about 85 wt % of said hydrophilic component.

12. A process as claimed in claim 1 wherein said coating is provided as a mixture comprising about 80 wt % of said hydrophilic component.

13. A process as claimed in claim 1 wherein said pore forming agent comprises a material selected such that said mesoporous layer is substantially free of components of said pore forming agent upon decomposition of said pore forming agent.

14. A process as claimed in claim 1 wherein said pore forming agent comprises a material selected to decompose in a mixture with said hydrophobic and hydrophilic components upon heating.

15. A process as claimed in claim 14 wherein said pore forming agent comprises a material selected such that said decomposition is particulate free.

16. A process as claimed in claim 14 wherein said pore forming agent comprises a material selected such that end products of said decomposition comprises gaseous and liquid components.

17. A process as claimed in claim 14 wherein said pore forming agent comprises a material selected such that end products of said decomposition comprise at least one gaseous component and $H_2O$.

18. A process as claimed in claim 1 wherein said pore forming agent comprises ammonium carbonate.

19. A process as claimed in claim 1 wherein said coating is provided as a mixture comprising up to about 15 wt % of said pore forming agent.

20. A process as claimed in claim 1 wherein said coating is provided as a mixture comprising about 5 wt % of said pore forming agent.

21. A process as claimed in claim 1 wherein a sufficient amount of said mesoporous layer is applied to said substrate to increase a porosity of said diffusion media relative to said diffusion media absent said mesoporous layer.

22. A process as claimed in claim 21 wherein said substantial increase in said porosity of said diffusion media is between about 5% and about 15%.

23. A process as claimed in claim 21 wherein said substantial increase in said porosity of said diffusion media is about 7.5%.

24. A process as claimed in claim 21 wherein said porosity of said diffusion media including said substrate and said mesoporous layer is about 84%.

25. A process as claimed in claim 1 wherein said coating further comprises a solvent comprising H$_2$O, isopropanol, or combinations thereof.

26. A process as claimed in claim 1 wherein said coating is provided such that it at least partially infiltrates said diffusion media substrate.

27. A process as claimed in claim 1 wherein a sufficient amount of said mesoporous layer is applied to said substrate to substantially increase an overall porosity of said diffusion media from about 78% absent said mesoporous layer to about 84% including said mesoporous layer.

28. A process as claimed in claim 1 wherein a sufficient amount of said mesoporous layer is applied to said substrate to yield a mesoporous layer thickness of between about 10 μm and about 25 μm.

29. A process as claimed in claim 28 wherein said diffusion media substrate is provided having a thickness of between about 100 μm and about 300 μm.

30. A process as claimed in claim 1 wherein said pore forming agent is decomposed by a heat treating process.

31. A process as claimed in claim 30 wherein said heat treating process is characterized by temperatures between about 75° C. and about 100° C.

32. A process as claimed in claim 30 wherein said beat treating process is characterized by temperatures above about 65° C.

33. A process for fabricating diffusion media, said process comprising:
   providing a diffusion media substrate comprising a porous fibrous matrix defining first and second major faces, wherein said substrate is free of fluorinated polymers and comprises an amount of carbonaceous material sufficient to render said substrate electrically conductive;
   applying mesoporous layer along at least a portion of one of said first and second major faces of said substrate to define a region carrying said mesoporous layer and regions outside of said mesoporous layer, wherein
   said mesoporous layer is applied to said fluorinated polymer free substrate by providing a coating comprising a hydrophobic component, a hydrophilic component, a pore forming agent, and a solvent,
   said hydrophobic component comprises a fluorinated polymer,
   said hydrophilic component comprises a carbonaceous substance comprising carbon fibers, carbon particles, or combinations thereof,
   said carbonaceous substance is characterized by a surface area of about 60 cm$^2$/g,
   said pore forming agent comprises ammonium carbonate,
   said regions outside of said mesoporous layer are free of fluorinated polymers,
   a sufficient amount of said mesoporous layer is applied to said substrate to substantially increase a porosity of said diffusion media relative to said diffusion media absent said mesoporous layer,
   said substantial increase in said porosity of said diffusion media is between about 5% and about 15%,
   said solvent comprises H$_2$O, isopropanol, or combinations thereof, and
   said coating is provided such that it at least partially infiltrates said diffusion media substrate; and
   decomposing said pore forming agent in a heat treating process such that said mesoporous layer is characterized by a porosity greater than a porosity of said diffusion media substrate.

* * * * *

UNITED STATES PATENT AND TRADEMARK OFFICE
CERTIFICATE OF CORRECTION

PATENT NO. : 6,967,039 B2  Page 1 of 1
APPLICATION NO. : 10/628856
DATED : November 22, 2005
INVENTOR(S) : O'Hara et al.

It is certified that error appears in the above-identified patent and that said Letters Patent is hereby corrected as shown below:

Col. 1, line 54, "area of about 60 $cm^2/g$. The pore forming agent comprises" should read --area of about 60 $m^2/g$. The pore forming agent comprises--;

Col. 3, line 33, "of about 60 $cm^2/g$ are suitable hydrophilic materials for the" should read --of about 60 $m^2/g$ are suitable hydrophilic materials for the--;

Col. 4, line 19, "of between about 50 $cm^2/g$ and about 250 $cm^2/g$. More" should read --of between about 50 $m^2/g$ and about 250 $m^2/g$. More--;

Col. 4, line 22, "characterized by surface areas of about 60 $cm^2/g$." should read --characterized by surface areas of about 60 $m^2/g$.--;

Col. 6, line 14, "between about 50 $cm^2/g$ and about 250 $cm^2/g$." should read --between about 50 $m^2/g$ and about 250 $m^2/g$.--;

Col. 6, line 17, "60 $cm^2/g$." should read --60 $m^2/g$.--; and

Col. 8, line 14, "face area of about 60 $cm^2/g$," should read --face area of about 60 $m^2/g$,--.

Signed and Sealed this

Twentieth Day of April, 2010

David J. Kappos
*Director of the United States Patent and Trademark Office*